(12) United States Patent
Cao et al.

(10) Patent No.: US 11,528,104 B2
(45) Date of Patent: Dec. 13, 2022

(54) OFMDA TONE PLAN FOR 80MHZ

(71) Applicant: NXP USA, Inc., Austin, TX (US)

(72) Inventors: Rui Cao, Sunnyvale, CA (US); Sudhir Srinivasa, Los Gatos, CA (US); Hongyuan Zhang, Fremont, CA (US)

(73) Assignee: NXP USA, Inc., Austin, TX (US)

( * ) Notice: Subject to any disclaimer, the term of this patent is extended or adjusted under 35 U.S.C. 154(b) by 12 days.

(21) Appl. No.: 17/211,969

(22) Filed: Mar. 25, 2021

(65) Prior Publication Data
US 2021/0320763 A1 Oct. 14, 2021

Related U.S. Application Data

(60) Provisional application No. 63/009,873, filed on Apr. 14, 2020.

(51) Int. Cl.
*H04L 5/00* (2006.01)
*H04W 88/08* (2009.01)
*H04W 84/12* (2009.01)

(52) U.S. Cl.
CPC ............ *H04L 5/0007* (2013.01); *H04W 88/08* (2013.01); *H04W 84/12* (2013.01)

(58) Field of Classification Search
CPC ........ H04L 5/0007; H04L 5/003; H04W 88/08; H04W 84/12; H04B 1/005; H04B 1/38
See application file for complete search history.

(56) References Cited

U.S. PATENT DOCUMENTS

| 2017/0214561 A1* | 7/2017 | Lee ..................... H04L 27/2633 |
| 2017/0265240 A1* | 9/2017 | Chen .................... H04L 5/0048 |
| 2019/0260531 A1* | 8/2019 | Chen .................... H04L 5/0041 |

OTHER PUBLICATIONS

Prepared by the 802.11 Working Group of the LAN/MAN Standards Committee of the IEEE Computer Society; IEEE P802.11ax™/D6.0, Nov. 2019; 780 pgs.

* cited by examiner

*Primary Examiner* — Mohammad S Anwar

(57) ABSTRACT

Various embodiments relate to a method for transmitting a Wi-Fi signal using a channel of 80 MHz or wider, wherein each 80 MHz segment has a tone plan, including: determining that a physical 20 MHz sub-channel overlaps the 80 MHz segment or OFDMA transmission is used for the 80 MHz segment; selecting an alternative 80 MHz tone plan; and transmitting data on the 80 MHz segment using the selected alternative 80 MHz tone plan.

27 Claims, 3 Drawing Sheets

OFMDA TONE PLAN FOR 80MHZ

CROSS-REFERENCE TO RELATED APPLICATIONS

This application claims benefit to U.S. Provisional Patent Application No. 63/009,873 filed Apr. 14, 2020, the contents of which are hereby incorporated by reference for all purposes as if fully set forth herein.

TECHNICAL FIELD

Various exemplary embodiments disclosed herein relate generally to OFMDA tone plan for 80 MHZ.

SUMMARY

A summary of various exemplary embodiments is presented below. Some simplifications and omissions may be made in the following summary, which is intended to highlight and introduce some aspects of the various exemplary embodiments, but not to limit the scope of the invention. Detailed descriptions of an exemplary embodiment adequate to allow those of ordinary skill in the art to make and use the inventive concepts will follow in later sections.

Various embodiments relate to a method for transmitting a Wi-Fi signal using a channel of 80 MHz or wider, wherein each 80 MHz segment has a tone plan, including: determining that a physical 20 MHz sub-channel overlaps the 80 MHz segment or OFDMA transmission is used for the 80 MHz segment; selecting an alternative 80 MHz tone plan; and transmitting data on the 80 MHz segment using the selected alternative 80 MHz tone plan.

Various embodiments are described, wherein selecting the alternative 80 MHz tone plan includes de-boosting tones in resource units (RUs) in the 80 MHz tone plan that overlap the physical 20 MHz sub-channel.

Various embodiments are described, wherein de-boosting tones includes nulling the tones.

Various embodiments are described, wherein the tone plan includes 1024 tones numbered [−512:511] and wherein the de-boosted tones are one of tones −259 and −257 and tones 256, 257, and 258.

Various embodiments are described, wherein N tones in the RUs adjacent to the de-boosted tones in the RUs are also de-boosted, where N is an integer.

Various embodiments are described, wherein the alternative 80 MHz tone plan includes a first resource unit (RU), a second RU, a third RU, and a fourth RU, wherein each RU includes a plurality of tones in increasing frequency from the first RU to the fourth RU, the tones in the second RU are shifted up in frequency by N tones from a second RU in the tone plan, where N is an integer, and the tones in the third RU are shifted down in frequency by N tones from a third RU in the tone plan.

Various embodiments are described, wherein $3 \leq N \leq 16$.

Various embodiments are described, wherein one of the second RU and third RU includes sub-RUs, and wherein the sub-RUs are also shifted by N tones.

Various embodiments are described, wherein the tone plan includes 1024 tones numbered [−512:511], the first RU includes tones [−500:−259], the second RU includes tones [−258+N:−17+N], the third RU includes tones [17−N;259−N], the fourth RU includes tones [259:500].

Various embodiments are described, wherein the 80 MHz tone plan includes a first resource unit (RU), a second RU, a third RU, and a fourth RU, wherein each RU includes a plurality of tones in increasing frequency from the first RU to the fourth RU, the alternative 80 MHz tone plan includes one of the first RU, third RU, fourth RU, and an alternate second RU shifted up in frequency to be adjacent to the third RU, and the first RU, second RU, fourth RU, and an alternate third RU shifted down in frequency to be adjacent to the second RU.

Various embodiments are described, wherein the alternate second RU and the alternate third RU span a plurality of DC tones.

Various embodiments are described, wherein selecting an alternative 80 MHz tone plan includes selecting one of alternate second RU and the alternate third RU based upon the location of the 20 MHz physical channel.

Various embodiments are described, wherein the tone plan includes 1024 tones numbered [−512:511], the alternate second RU includes tones [−231:−4, 4:16], and the second RU includes tones [−16:−4, 4:232].

Various embodiments are described, wherein the tone plan includes an unused 26 tone RU, the 26 tone RU includes tones [−257:232] when the alternate second RU is used, and the 26 tone RU includes tones [232:257] when the alternate third RU is used.

Further various embodiments relate to an access point configured to transmit a Wi-Fi signal using an 80 MHz channel having a tone plan, including: a transceiver configured to transmit and receive wireless signals; and a processor configured to control the transceiver by: determining that a physical 20 MHz sub-channel overlaps the 80 MHz channel; selecting an alternative 80 MHz tone plan; and transmitting data on the 80 MHz channel using the selected alternative 80 MHz tone plan.

Various embodiments are described, wherein the alternative 80 MHz tone plan includes a first resource unit (RU), a second RU, a third RU, and a fourth RU, wherein each RU includes a plurality of tones in increasing frequency from the first RU to the fourth RU, the tones in the second RU are shifted up in frequency by N tones from a second RU in the tone plan, and the tones in the third RU are shifted down in frequency by N tones from a third RU in the tone plan.

The access point of claim 16, wherein $3 \leq N \leq 16$.

The access point of claim 16, wherein one of the second RU and third RU includes sub-RUs, and wherein the sub-RUs are also shifted by N tones.

Various embodiments are described, wherein the tone plan includes 1024 tones numbered [−512:511], the first RU includes tones [−500:−259], the second RU includes tones [−258+N:−17+N], the third RU includes tones [17−N;259−N], and the fourth RU includes tones [259:500].

The access point of claim 16, wherein selecting the alternative 80 MHz tone plan includes de-boosting tones in resource units (RUs) in the 80 MHz tone plan that overlap the physical 20 MHz sub-channel.

Various embodiments are described, wherein the 80 MHz tone plan includes a first resource unit (RU), a second RU, a third RU, and a fourth RU, wherein each RU includes a plurality of tones in increasing frequency from the first RU to the fourth RU, the alternative 80 MHz tone plan includes one of the first RU, third RU, fourth RU, and an alternate second RU shifted up in frequency to be adjacent to the third RU, and the first RU, second RU, fourth RU, and an alternate third RU shifted down in frequency to be adjacent to the second RU.

Further various embodiments relate to a station configured to receive a Wi-Fi signal from an access point using an 80 MHz channel having a tone plan, including: a transceiver configured to transmit and receive wireless signals; and a processor configured to control the transceiver by: receiving a message indicating an alternative 80 MHz tone plan when a physical 20 MHz sub-channel overlaps the 80 MHz channel; and transmitting data on the 80 MHz channel using the selected alternative 80 MHz tone plan.

Various embodiments are described, wherein the alternative 80 MHz tone plan includes a first resource unit (RU), a second RU, a third RU, and a fourth RU, wherein each RU includes a plurality of tones in increasing frequency from the first RU to the fourth RU, the tones in the second RU are shifted up in frequency by N tones from a second RU in the tone plan, and the tones in the third RU are shifted down in frequency by N tones from a third RU in the tone plan.

Various embodiments are described, wherein one of the second RU and third RU includes sub-RUs, and wherein the sub-RUs are also shifted by N tones.

Various embodiments are described, wherein the tone plan includes 1024 tones numbered [−512:511], the first RU includes tones [−500:−259], the second RU includes tones [−258+N:−17+N], the third RU includes tones [17−N;259−N], the fourth RU includes tones [259:500].

Various embodiments are described, wherein selecting the alternative 80 MHz tone plan includes de-boosting tones in resource units (RUs) in the 80 MHz tone plan that overlap the physical 20 MHz sub-channel.

Various embodiments are described, wherein the 80 MHz tone plan includes a first resource unit (RU), a second RU, a third RU, and a fourth RU, wherein each RU includes a plurality of tones in increasing frequency from the first RU to the fourth RU, the alternative 80 MHz tone plan includes one of the first RU, third RU, fourth RU, and an alternate second RU shifted up in frequency to be adjacent to the third RU, and the first RU, second RU, fourth RU, and an alternate third RU shifted down in frequency to be adjacent to the second RU.

BRIEF DESCRIPTION OF THE DRAWINGS

In order to better understand various exemplary embodiments, reference is made to the accompanying drawings, wherein.

To facilitate understanding, identical reference numerals have been used to designate elements having substantially the same or similar structure and/or substantially the same or similar function.

DETAILED DESCRIPTION

The description and drawings illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments.

In IEEE 802.11ax, a version of Wi-Fi, orthogonal frequency-division multiple access (OFDMA) is introduced in order to allow for data from multiple users to be transmitted at the same time on the same carrier. OFDMA segregates the spectrum in time-frequency resource units (RUs). A central coordinating entity assigns RUs for reception or transmission to associated stations. Through the central scheduling of the RUs contention overhead can be avoided, which increases efficiency in scenarios of dense deployments. The centrally controlled medium access with dynamic assignment may utilize resource unites (RU) of different sizes using 26, 52, 106, 242, 484, 996, or 996×2 tones per station. Each tone consists of a single subcarrier of 78.125 kHz bandwidth. Therefore, RUs of different sizes using 26, 52, 106, 242, 484, 996, or 996×2 tones have transmission bandwidths of approximately 2 MHz, 5 MHz, 10 MHz, 20 MHz, 40 MHz, 80 MHz and 160 MHz respectively. An 160 MHz transmission uses two 80 MHz tone plans. In IEEE 802.11be, the signal bandwidth is as wide as 320 MHz and each 80 MHz will use the same 80 MHz tone plan.

Figure 1:
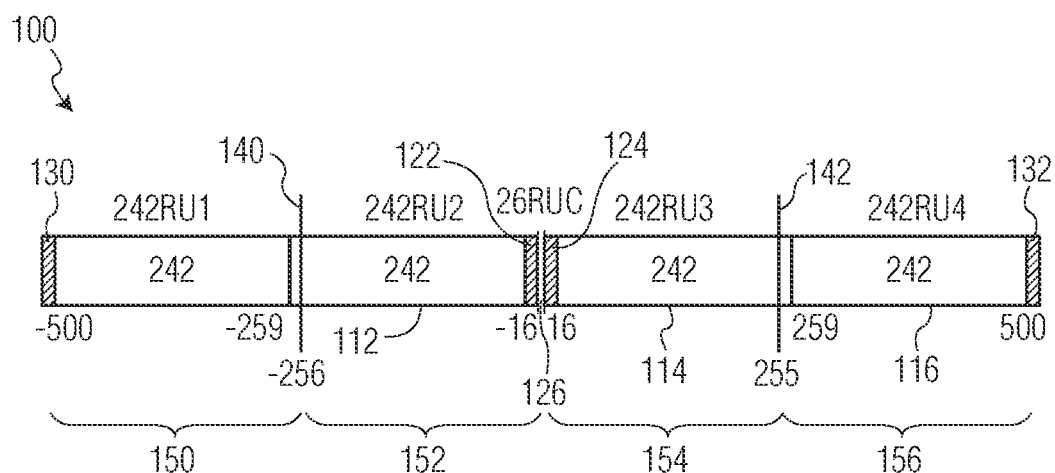
FIG. 1 illustrates the 80 MHz OFDMA tone plan for IEEE 802.11ax.

FIG. 1 illustrates the 80 MHz OFMDA tone plan for IEEE 802.11ax. The 80 MHz tone plan 100 is made up of four 20 MHz RUs: 242RU1 110; 242RU2 112; 242RU3 116; and 242RU4 116. The 80 MHz tone plan also includes a 26 tone 2 MHz RU 26RUC 120 in the center between the RUs 112 and 114. The 80 MHz tone plan 100 includes 7 DC tones 126 in the center of the 26RUC 120. Further, the 80 MHz tone plan 100 includes 12 guard tones 130 on the left and 11 guard tones 132 on right.

The four 20 MHz RUs 110, 112, 114, 116 include tones [−500:−259], [−258:−17], [17:258], and [259:400] respectively. FIG. 1 illustrates the physical 20 MHz sub-channel boundaries 140 and 142 that are present in other versions of IEEE 802.11. Four physical 20 MHz sub-channels 150, 152, 154, 156 are also illustrated. These boundaries 140, 142 correspond to tones −256 and 255 respectively. This means that the RU 112 spans two physical 20 MHz regions 150 and 156 with two tones −258, and −257 in 20 MHz region 150. Likewise, RU 114 spans two physical 20 MHz regions 154 and 156 with three tones 256, 257, 258 in the 20 MHz region 156. As a result, transmissions in the 20 MHz regions 150 and 156 may lead to interference with the RUs 112 and 114 respectively. Embodiments of different solutions to overcome this problem will be described herein. Further, the embodiments described herein may be applied to each 80 MHz segment within a transmission of signal bandwidth larger than or equal to 80 MHz.

In a first embodiment, the overlapping tones [−258, −257] or [256, 257, 258] may be nulled or de-boosted by X dB, where X may be different for each tone. The value for X may be selected based upon various criteria including the power of the signal present in the 20 MHz sub-channels 150 and 156. Further, a certain number of adjacent tones (i.e., −256, −255, . . . or 255, 254, . . . ) in the RUs 112 and 114 may also be nulled or de-boosted to reduce the likelihood of interference. This approach may be applied when signals are being transmitted in the 20 MHz sub-channels 150 and 154. This approach does not require any change in the tone plan for 80 MHz transmissions.

Figure 2:
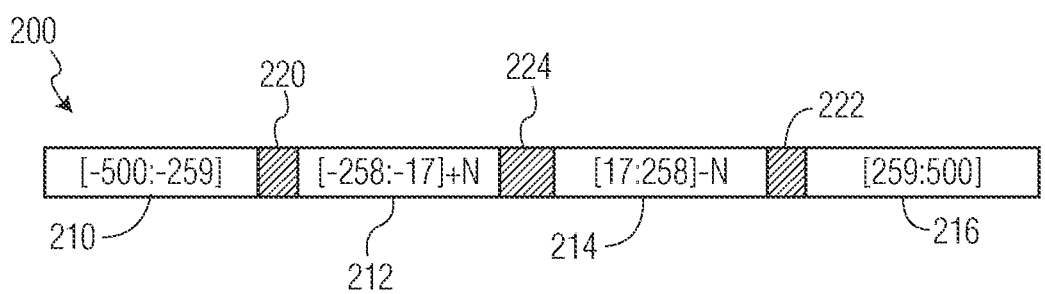
FIG. 2 illustrates an 80 MHz tone plan 200 where the two middle RUs 212 and 214 are shifted by N tones towards the center.

A second embodiment includes tone shifting RUs 112 and 114. FIG. 2 illustrates an 80 MHz tone plan 200 where the two middle RUs 212 and 214 are shifted by N tones towards the center. That is RU 212 is shifted N tones to the right [−258+N; −17+N] (or up in frequency), and RU 214 is shifted N tones to the left [17−N; 258−N] (or down in frequency). RU 210 and RU 216 remain in the same positions as in the standard IEEE 802.11ax tone plan, i.e., [−500:−259] and [259:500] respectively. This shift needs to be large enough so that there is no overlap with the 20 MHz sub-channel boundary. A shift of N=3 should result in all of the tones for RU 212 and RU 214 being within the 20 MHz boundary. Larger values may be used as well. The upper limit on N is that there are a total of 33 tones (7 DC tones and 26 tones in 26RUC) available between RU 212 and RU 214. For example, if a minimum of 1 DC tone is needed then N may be as high as 16, but if 3 or 7 DC tones are needed, then the maximum value for N would be 15 and 13 respectively. A value of N greater than 3 provides additional guard space that means that tones at the outer edges of RU 212 and RU 214 adjacent the 20 MHz sub-channels do not need to be de-boosted or nulled to avoid interference at the edges.

This shift in the tone plan may be static so that is always applied. Alternatively, the tone shift by N may only be used when overlap may occur.

Because of the shift, the 26 tone RU is removed, and the use of this 2 MHz is lost. Further, any corresponding 106, 42, or 26 tone RUs within RU 212 and RU 214 will be shifted by N as well so that a spectrum mask violation is avoided.

Figure 3A:
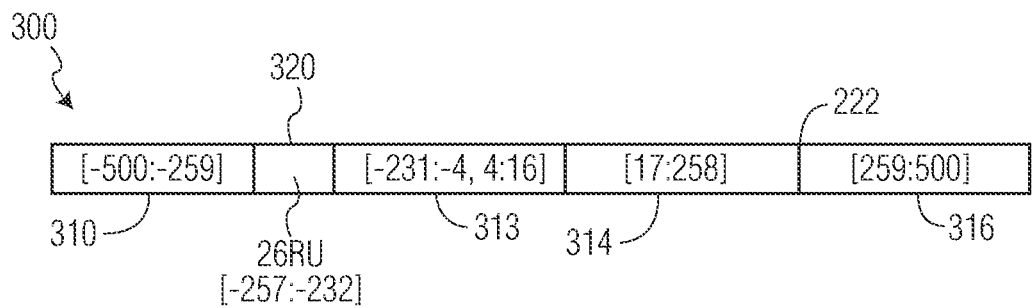
FIG. 3A illustrates a first new RU.

A third embodiment defines two new RUs and adds an unused 26 tone RU. FIG. 3A illustrates a first new RU 313. In FIG. 3A, RU 310, 314, and 316 stay the same as in the IEEE 80 MHz tone plan, i.e., [−500:−259], [17:258], and [259:500], respectively. The first new RU 313 replaces RU 112, and RU 313 includes tones [−231:−4, 4:16]. Note that RU 313 spans the 7 DC tones [−3:3]. Further, a 26 tone RU 320 is included using tones [−257:−232]. As RU 320 overlaps the 20 MHz sub-channel boundary, it will not be used when it overlaps with a 20 MHz sub-channel transmission.

Figure 3B:
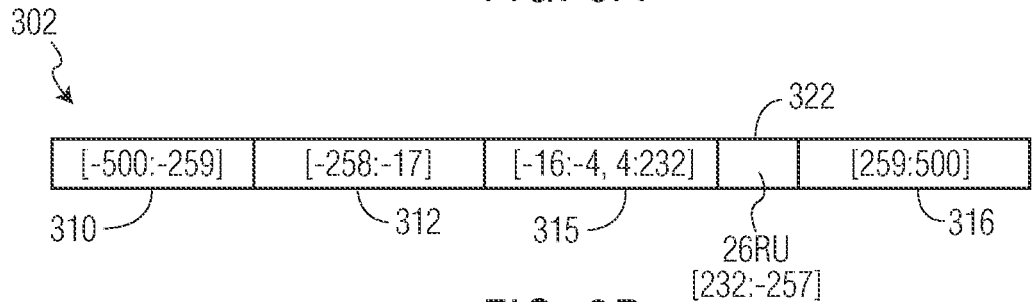
FIG. 3B illustrates a second new RU.

FIG. 3B illustrates a second new RU 315. In FIG. 3B, RU 310, 312, and 316 stay the same as in the IEEE 80 MHz tone plan, i.e., [−500:−259], [−258:−17], and [259:500], respectively. The second t new RU 315 replaces RU 114, and RU 315 includes tones [−16:−4, 4:232]. Note that RU 313 spans the 7 DC tones [−3:3]. Further, a 26 tone RU 322 is included using tones [232:257]. As RU 322 overlaps the 20 MHz sub-channel boundary, it will not be used when it overlaps with a 20 MHz sub-channel transmission.

When the first 20 MHz sub-channel 150 is being used, then the first new RU 313 and 26 tone RU 320 will be used to avoid overlap. When the fourth 20 MHz sub-channel 156 is being used, then the second new RU 315 and 26 tone RU 322 will be used to avoid overlap.

Figure 4:
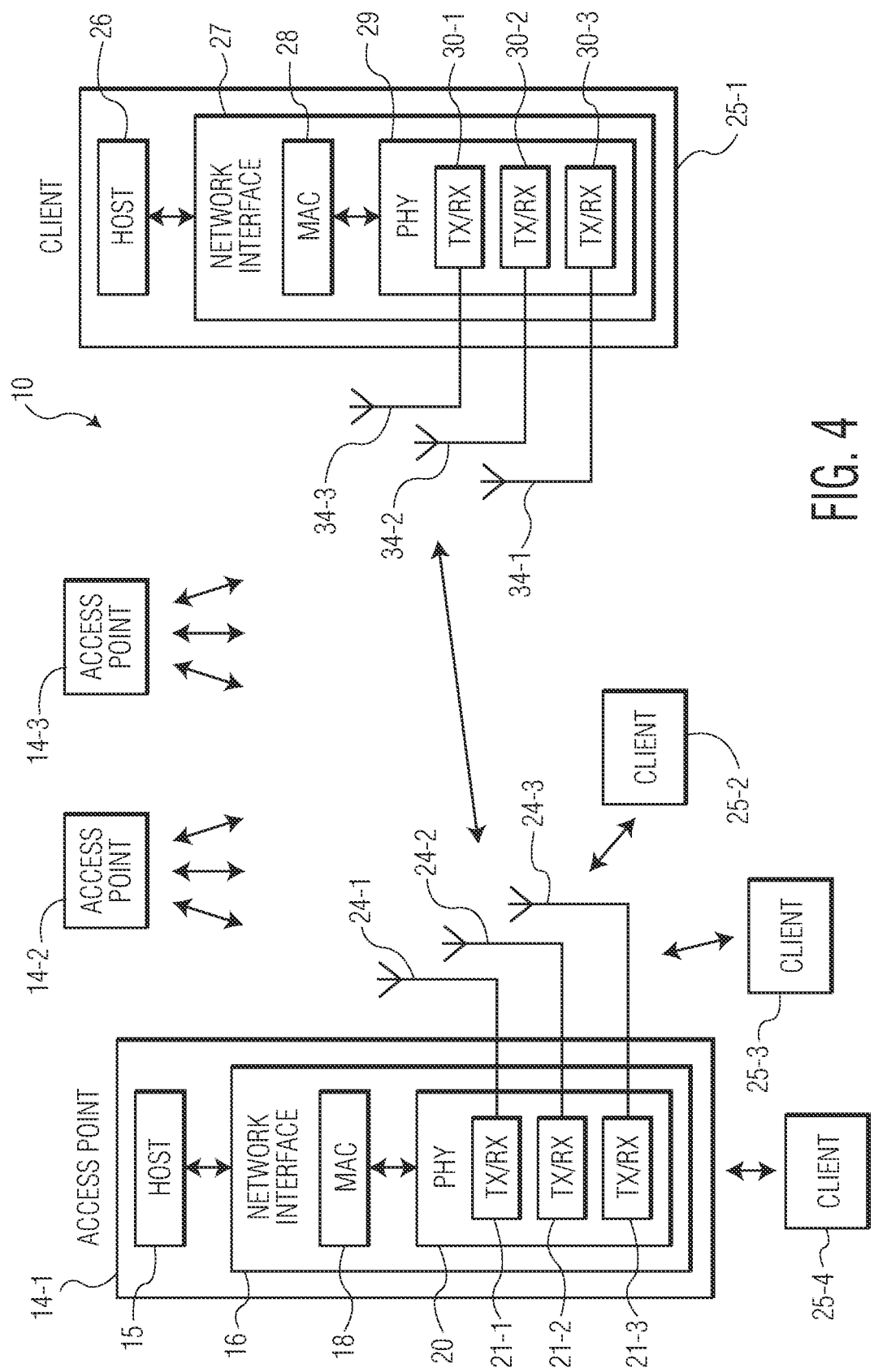
FIG. 4 is a block diagram of an example wireless local area network (WLAN), according to an embodiment.

FIG. 4 is a block diagram of an example wireless local area network (WLAN) 10, according to an embodiment. An access point (AP) 14-1 includes a host processor 15 coupled to a network interface 16. The network interface 16 includes a medium access control (MAC) processing unit 18 and a physical layer (PHY) processing unit 20. The PHY processing unit 20 includes a plurality of transceivers 21, and the transceivers 21 are coupled to a plurality of antennas 24. Although three transceivers 21 and three antennas 24 are illustrated in FIG. 4, the AP 14 may include different numbers (e.g., 1, 2, 4, 5, etc.) of transceivers 21 and antennas 24 in other embodiments. The WLAN 10 may include multiple APs 14-1, 14-2, 14-3 as shown, but any number of APs 14 may be included in WLAN 10.

The WLAN 10 includes a plurality of client stations 25. Although four client stations 25 are illustrated in FIG. 4, the WLAN 10 may include different numbers (e.g., 1, 2, 3, 5, 6, etc.) of client stations 25 in various scenarios and embodiments. Two or more of the client stations 25 are configured to receive corresponding data streams that are transmitted simultaneously by the AP 14. Additionally, two or more of the client stations 25 are configured to transmit corresponding data streams to the AP 14 such that the AP 14 simultaneously receives the data streams. Also, the client stations 25 are configured to receive data streams that are transmitted simultaneously by multiple APs 14. Likewise, the client stations 25 may transmit data streams simultaneously to the multiple APs 14.

A client station 25-1 includes a host processor 26 coupled to a network interface 27. The network interface 27 includes a MAC processing unit 28 and a PHY processing unit 29. The PHY processing unit 29 includes a plurality of transceivers 30, and the transceivers 30 are coupled to a plurality of antennas 34. Although three transceivers 30 and three antennas 34 are illustrated in FIG. 4, the client station 25-1 may include different numbers (e.g., 1, 2, 4, 5, etc.) of transceivers 30 and antennas 34 in other embodiments.

In an embodiment, one or more of the client stations 25-2, 25-3, and 25-4 has a structure the same as or similar to the client station 25-1. In these embodiments, the client stations 25 structured like the client station 25-1 have the same or a different number of transceivers and antennas. For example, the client station 25-2 has only two transceivers and two antennas (not shown), according to an embodiment.

In an embodiment, the APs 14 and the client stations 25 contend for communication medium using carrier sense multiple access with collision avoidance (CSMA/CA) protocol or another suitable medium access protocol. Further, in an embodiment, the APs 14 or a client station 25 dynamically selects a bandwidth for a transmission based on channels available for the transmission.

In an embodiment, the APs 14 are configured to simultaneously transmit different OFDM units to different client stations 25 by forming an OFDMA data unit that includes the different OFDM data units modulated in respective sub-channel blocks of the OFDMA data unit. In an embodiment, the AP 14 allocates different sub-channels to different client stations and forms the OFDMA data unit that includes OFDM data units directed to by modulating the different client stations in sub-channel blocks corresponding to the sub-channels assigned to the client stations.

In an embodiment, the APs 14 are configured to simultaneously transmit different OFDM units to different client stations 25 by transmitting the different OFDM data units via different space time streams of a MU-MIMO communication channel. In an embodiment, the APs 14 allocates different sub-channels (i.e., space time streams) to different client stations and forms the OFDM data units and modulates the different OFDM data units to the space time streams corresponding to the sub-channels assigned to the client stations.

Figure 5:
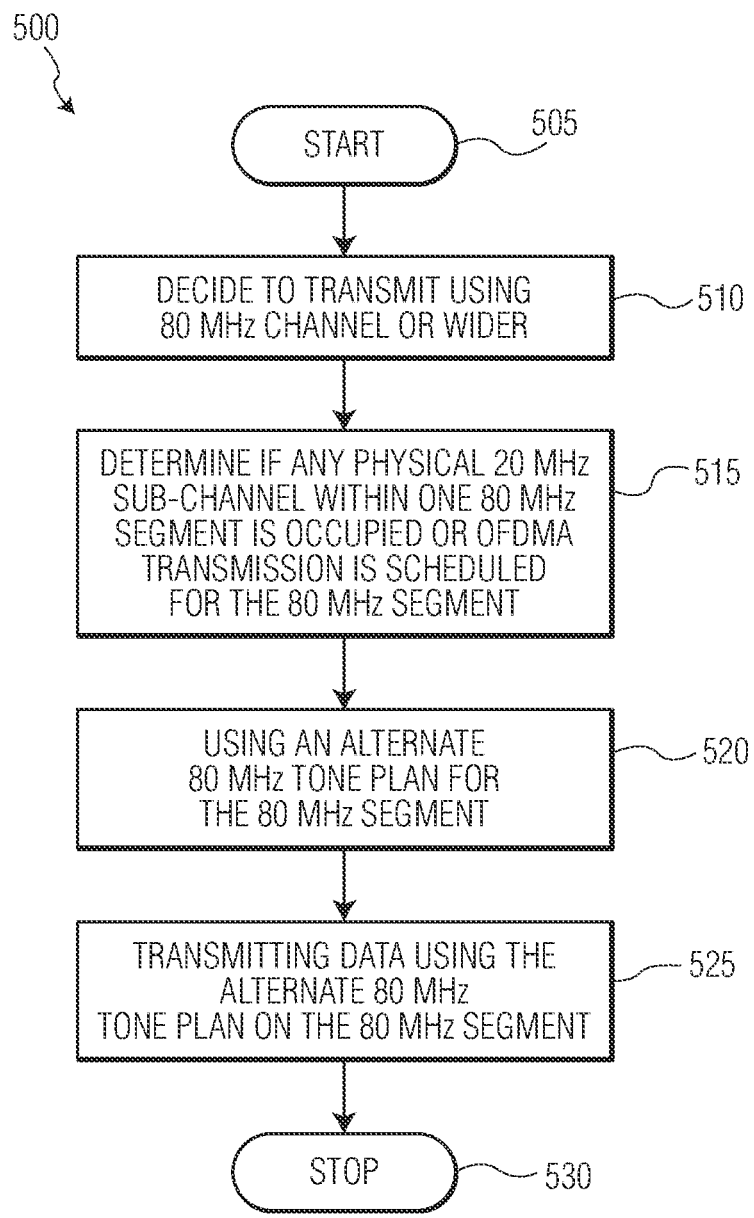
FIG. 5 illustrates a method of how an access point would implement using an alternative 80 MHz tone plan when overlapping with a physical 20 MHz sub-channel.

FIG. 5 illustrates a method 500 of how an access point would implement using an alternative 80 MHz tone plan when overlapping with a physical 20 MHz sub-channel. The method begins at 505. The access point then decides to transmit using an 80 MHz channel or wider 510. Next, the access point decides if any physical 20 MHz sub-channel with each 80 MHz segment of the entire channel width is in use 515. This may be done by physically sensing the channel using for example by performing a clear channel assessment (CCA). Alternatively, the use of the channel may be done virtually using a network allocation vector (NAV). The access point may decide to assign OFDMA transmission within one 80 MHz segment, even though none of the 20 MHz sub-channels are occupied. In either case, the access point may then select an alternative 80 MHz tone plan 520. This may be accomplished using any of the three embodiments described above. If the first embodiment is used, then the overlapping tones may be nulled or de-boosted. Also, additional adjacent tones may be nulled or de-boosted depending upon potential interference. If the second embodiment is used, then the two middle RUs are shifted towards the middle of the 80 MHz bandwidth by N tones. Finally, if the third embodiment is used, then based upon which of RUs overlap the physical 20 MHz sub-channel in use, then either the first or second alternative RU is used along with an alternative 26 tone RU. After selecting the alternate 80 MHz tone plan, the access point may then transmit the data using the selected alternative 80 MHz tone plan 525. The method 500 then ends 530.

The system and method described herein may be carried out using specific hardware to perform the actions or software running on a processor may implement the embodiments. The processor may be connected to memory and storage, where the software instructions are stored in the storage. The processor may be any general purpose processor, a graphics processor, a signal processor, or any other type of specialized processor.

Any combination of specific software running on a processor to implement the embodiments of the invention, constitute a specific dedicated machine.

As used herein, the term "non-transitory machine-readable storage medium" will be understood to exclude a transitory propagation signal but to include all forms of volatile and non-volatile memory.

It should be appreciated by those skilled in the art that any block diagrams herein represent conceptual views of illustrative circuitry embodying the principles of the invention.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. A method for transmitting a Wi-Fi signal using a channel of 80 MHz or wider, wherein each 80 MHz segment within the channel has a tone plan and is divided into a set of resource units (RUs), comprising:
   determining that a physical 20 MHz sub-channel overlaps both a first RU assigned to a first Wi-Fi device and a second RU assigned to a second Wi-Fi device within the set of RUs;
   selecting an alternative 80 MHz tone plan that reduces an interference between the first RU and the second RU; and
   transmitting data on the 80 MHz segment using the alternative 80 MHz tone plan.

2. The method of claim 1,
   wherein the physical 20 MHz sub-channel overlaps the first RU more than the second RU; and
   wherein selecting the alternative 80 MHz tone plan de-boosts tones in the second RU.

3. The method of claim 2,
   wherein selecting the alternative 80 MHz tone plan nulls the tones in the second RU.

4. The method of claim 2,
   wherein the tone plan includes 1024 tones numbered [−512:511] and wherein the de-boosted tones are one of tones −259 and −257 and tones 256, 257, and 258.

5. The method of claim 2,
   wherein N tones in the RUs adjacent to the de-boosted tones in the RUs are also de-boosted, where N is an integer.

6. The method of claim 1,
   wherein the physical 20 MHz sub-channel overlaps the first RU more than the second RU;
   wherein the first RU and second RU include a plurality of tones in increasing frequency from the first RU to the second RU,
   wherein the tones in the second RU are shifted up in frequency until the physical 20 MHz sub-channel no longer overlaps the second RU; or
   wherein the tones in the second RU are shifted down in frequency until the physical 20 MHz sub-channel no longer overlaps the second RU.

7. The method of claim 6,
   wherein the tones in the second RU are shifted by N tones, where N is an integer; and
   wherein $3 \leq N \leq 16$.

8. The method of claim 6,
   wherein the second RU includes sub-RUs, and
   wherein the sub-RUs are also shifted by N tones.

9. The method of claim 6, wherein
   the tone plan includes 1024 tones numbered [−512:511],
   the first RU includes tones [−500:259], and
   the second RU includes tones [−258+N:17+N].

10. The method of claim 1,
    wherein the 80 MHz tone plan includes the first RU, the second RU, a third RU, and a fourth RU,
    wherein each RU includes a plurality of tones in increasing frequency from the first RU to the fourth RU,
    wherein the alternative 80 MHz tone plan includes one of,
      the first RU, the third RU, the fourth RU, and an alternate tone plan second RU shifted up in frequency to be adjacent to the third RU, or
      the first RU, the second RU, the fourth RU, and an alternate tone plan third RU shifted down in frequency to be adjacent to the second RU.

11. The method of claim 10,
    wherein the alternate tone plan second RU and the alternate tone plan third RU span a plurality of DC tones.

12. The method of claim 10,
    wherein selecting an alternative 80 MHz tone plan includes selecting one of the alternate tone plan second RU or the alternate tone plan third RU based upon a location of the 20 MHz physical channel.

13. The method of claim 10, wherein
    the tone plan includes 1024 tones numbered [−512:511],
    the alternate tone plan second RU includes tones [−231:−4, 4:16], and
    the second RU includes tones [−16:−4, 4:232].

14. The method of claim 11,
    wherein the tone plan includes an unused 26 tone RU, wherein the 26 tone RU includes tones [−257:232] when the alternate tone plan second RU is used, and wherein the 26 tone RU includes tones [232:257] when the alternate tone plan third RU is used.

15. An access point configured to transmit a Wi-Fi signal using an 80 MHz channel having a tone plan, comprising:
    a transceiver configured to transmit and receive wireless signals; and
    a processor configured to control the transceiver by:
        determining that a physical 20 MHz sub-channel overlaps both a first RU assigned to a first Wi-Fi device and a second RU assigned to a second Wi-Fi device within the set of RUs;
        selecting an alternative 80 MHz tone plan that reduces an interference between the first RU and the second RU; and
        transmitting data on the 80 MHz channel using the alternative 80 MHz tone plan.

16. The access point of claim 15,
    wherein the first RU and second RU include a plurality of tones in increasing frequency from the first RU to the second RU,
    wherein the tones in the second RU are shifted up in frequency until the physical 20 MHz sub-channel no longer overlaps the second RU; or
    wherein the tones in the second RU are shifted down in frequency until the physical 20 MHz sub-channel no longer overlaps the second RU.

17. The access point of claim 16,
    wherein the tones in the second RU are shifted by N tones, where N is an integer; and
    wherein 3≤N≤16.

18. The access point of claim 16,
    wherein the second RU includes sub-RUs, and
    wherein the sub-RUs are also shifted by N tones.

19. The access point of claim 16, wherein
    the tone plan includes 1024 tones numbered [−512:511],
    the first RU includes tones [−500:−259], and
    the second RU includes tones [−258+N:−17+N].

20. The access point of claim 16,
    wherein the physical 20 MHz sub-channel overlaps the first RU more than the second RU; and
    wherein selecting the alternative 80 MHz tone plan de-boosts tones in the second RU.

21. The access point of claim 16,
    wherein the 80 MHz tone plan includes the first RU, the second RU, a third RU, and a fourth RU, wherein each RU includes a plurality of tones in increasing frequency from the first RU to the fourth RU,
    wherein the alternative 80 MHz tone plan includes one of,
    the first RU, the third RU, the fourth RU, and an alternate tone plan second RU shifted up in frequency to be adjacent to the third RU, or
    the first RU, the second RU, the fourth RU, and an alternate tone plan third RU shifted down in frequency to be adjacent to the second RU.

22. A station configured to receive a Wi-Fi signal from an access point using an 80 MHz channel having a tone plan and is divided into a set of resource units (RUs), comprising:
    a transceiver configured to transmit and receive wireless signals; and
    a processor configured to control the transceiver by:
        receiving a message indicating an alternative 80 MHz tone plan when a physical 20 MHz sub-channel overlaps both a first RU assigned to the station and a second RU assigned to another Wi-Fi device within the set of RUs; and
        transmitting data on the 80 MHz channel using the alternative 80 MHz tone plan such that an interference between the first RU and the second RU is reduced.

23. The station of claim 22,
    wherein the physical 20 MHz sub-channel overlaps the first RU more than the second RU;
    wherein the first RU and second RU include a plurality of tones in increasing frequency from the first RU to the second RU,
    wherein the tones in the second RU are shifted up in frequency until the physical 20 MHz sub-channel no longer overlaps the second RU; or
    wherein the tones in the second RU are shifted down in frequency until the physical 20 MHz sub-channel no longer overlaps the second RU.

24. The station of claim 22,
    wherein the second RU includes sub-RUs, and
    wherein the sub-RUs are also shifted by N tones.

25. The station of claim 22, wherein
    the tone plan includes 1024 tones numbered [−512:511],
    the first RU includes tones [−500:−259], and
    the second RU includes tones [−258+N:−17+N].

26. The station of claim 22,
    wherein the physical 20 MHz sub-channel overlaps the first RU more than the second RU; and
    wherein selecting the alternative 80 MHz tone plan de-boosts tones in the second RU.

27. The station of claim 22,
    wherein the 80 MHz tone plan includes the first RU, the second RU, a third RU, and a fourth RU,
    wherein each RU includes a plurality of tones in increasing frequency from the first RU to the fourth RU,
    wherein the alternative 80 MHz tone plan includes one of,
    the first RU, the third RU, the fourth RU, and an alternate tone plan second RU shifted up in frequency to be adjacent to the third RU, or
    the first RU, the second RU, the fourth RU, and an alternate tone plan third RU shifted down in frequency to be adjacent to the second RU.

* * * * *